US010944580B2

(12) United States Patent
Avasarala

(10) Patent No.: US 10,944,580 B2
(45) Date of Patent: Mar. 9, 2021

(54) RESPONDING TO A TERMINATION REASON IN AN ACCOUNTING RECORD

(71) Applicant: AT&T INTELLECTUAL PROPERTY I, L.P., Atlanta, GA (US)

(72) Inventor: Ranjit Kumar Avasarala, Buffalo Grove, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 101 days.

(21) Appl. No.: 16/207,963

(22) Filed: Dec. 3, 2018

(65) Prior Publication Data
US 2020/0177400 A1 Jun. 4, 2020

(51) Int. Cl.
*H04L 12/14* (2006.01)
*H04M 15/04* (2006.01)
*H04L 29/06* (2006.01)

(52) U.S. Cl.
CPC ...... *H04L 12/1425* (2013.01); *H04L 65/1006* (2013.01)

(58) Field of Classification Search
None
See application file for complete search history.

(56) References Cited

U.S. PATENT DOCUMENTS

| 6,330,323 | B1 | 12/2001 | Gottlieb et al. |
| 7,978,686 | B2 | 7/2011 | Goyal et al. |
| 8,230,109 | B2 | 7/2012 | Van Elburg et al. |
| 8,850,012 | B2 | 9/2014 | Ropolyi et al. |
| 9,219,764 | B2 | 12/2015 | Allen et al. |
| 9,282,444 | B2 | 3/2016 | Bakker |
| 9,319,434 | B2 | 4/2016 | Coulas et al. |
| 9,787,839 | B1* | 10/2017 | Noble, Jr. ............. H04M 7/129 |
| 10,044,553 | B2 | 8/2018 | Abichandani et al. |
| 2008/0112397 | A1* | 5/2008 | Kumarasamy ........ H04L 65/104 370/356 |
| 2010/0174630 | A1* | 7/2010 | Shan ..................... H04M 15/00 705/34 |
| 2011/0159840 | A1* | 6/2011 | Cai ..................... H04L 12/1403 455/406 |
| 2012/0116938 | A1* | 5/2012 | Cai .................... G06O 30/0284 705/34 |

(Continued)

*Primary Examiner* — Duc T Duong
(74) *Attorney, Agent, or Firm* — Amin, Turocy & Watson, LLP

(57) ABSTRACT

Technology to respond to a termination reason of an accounting record via an improved charging component is disclosed. The disclosed subject matter can be backwards compatible to support responding to a conventional SIP 'BYE' method and a conventional SIP 'CANCEL' method. Additionally, the disclosed subject matter can respond to other SIP methods, empty reason-headers, etc. In an aspect, a reason-header can be forced into an accounting record based on received session termination information. In an embodiment, the reason-header can be determined to satisfy a rule related to acceptable reason-headers. Where the rule is determined to be unsatisfied, a query can be generated toward a device that supported the now terminated communication, wherein a response to the query can comprise another reason-header that can be determined to satisfy the rule. The accounting record can be updated based on the other reason-header and employed in generating a charging data record that can alter corresponding billing.

19 Claims, 10 Drawing Sheets

(56) References Cited

U.S. PATENT DOCUMENTS

| | | | | |
|---|---|---|---|---|
| 2012/0328083 A1* | 12/2012 | Kung | .................... | H04M 15/41 |
| | | | | 379/32.01 |
| 2013/0010651 A1* | 1/2013 | Cai | ........................ | H04L 12/14 |
| | | | | 370/259 |
| 2013/0301480 A1* | 11/2013 | Anulf | ...................... | H04W 4/24 |
| | | | | 370/259 |
| 2013/0322263 A1* | 12/2013 | Lang | .................... | H04M 15/41 |
| | | | | 370/244 |
| 2014/0078937 A1* | 3/2014 | Cai | ...................... | H04M 15/57 |
| | | | | 370/259 |
| 2015/0244874 A1* | 8/2015 | Tornkvist | .......... | H04M 15/8228 |
| | | | | 370/242 |
| 2015/0288726 A1* | 10/2015 | Smith | .................. | H04L 65/1069 |
| | | | | 370/261 |
| 2017/0374202 A1* | 12/2017 | Zait | .................... | H04M 15/8228 |
| 2018/0183932 A1 | 6/2018 | Gao et al. | | |
| 2019/0149583 A1* | 5/2019 | Jutila | .................. | H04L 65/1073 |
| | | | | 455/435.1 |
| 2020/0137219 A1* | 4/2020 | Donnenwirth | ........ | H04M 15/41 |

\* cited by examiner

RESPONDING TO A TERMINATION REASON IN AN ACCOUNTING RECORD

TECHNICAL FIELD

The disclosed subject matter relates to responding to an invalid termination reason in an accounting record and, more particularly, to updating an accounting record to comprise a termination reason and/or to querying a corresponding session initiation protocol (SIP) service for a termination reason, which can result in altering received revenue through adapting billing of corresponding customers.

BACKGROUND

Current termination of a communication instance by session initiation protocol (SIP) error messages can result in an accounting record that may not indicate a reason, e.g., may not comprise a reason-header access value pair (AVP). Under current 3GPP TS 32.299, the reason-header should be present only when a call is terminated using a 'SIP BYE' or 'SIP CANCEL' method. As such, termination of a communication under other reasons may not result in advancing a reason-header AVP to a charging data record, e.g., termination under numerous other 4xx and 5xx methods can fail to indicate a reason for the termination. Where the reason for termination can result in different billing, it can be desirable to know why a communication has terminated.

DETAILED DESCRIPTION

Figure 1:
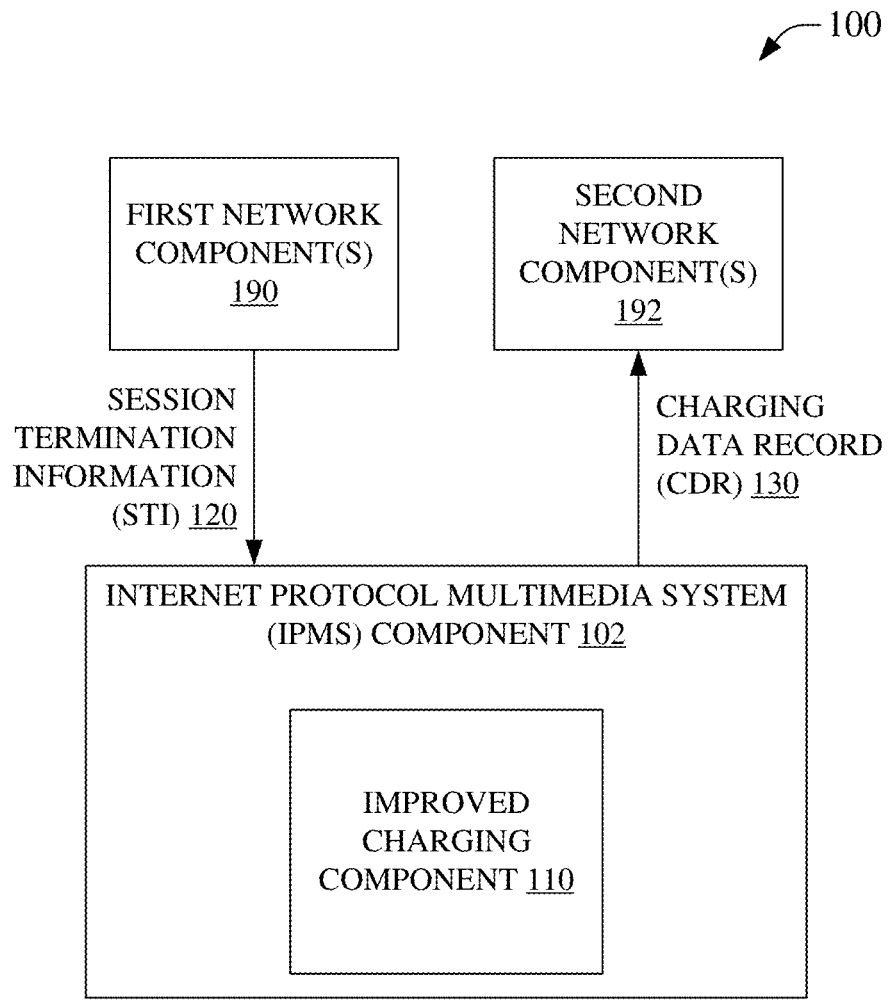
FIG. 1 is an illustration of an example system that can facilitate responding to an invalid termination reason in an accounting record via an improved charging component, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional termination of a communication instance by session initiation protocol (SIP) error messages can result in an accounting record that may not indicate a reason, e.g., may not comprise a reason-header access value pair (AVP). The reason-header, according to current 3GPP TS 32.299, should be present only when a call is terminated using a 'SIP BYE' or 'SIP CANCEL' method. As such, termination of a communication under other reasons can result in a charging data record (CDR) not comprising a reason-header AVP and, for example, termination under some 4xx and 5xx methods can fail to indicate a reason for the termination in a billing record which can affect revenue. Where the reason for termination can result in different billing, it can be desirable to know why a communication has terminated.

Technologies can be implemented to cause reporting of a reason-header AVP in a charging data record via an improved charging component based on session termination information (STI). In an aspect, when a SIP message, e.g., a SIP error message, etc., is received, STI can comprise data relevant to determining a reason-header AVP. In an embodiment, a charging transfer function (CTF) can verify that an accounting record (ACR) comprises a reason value, e.g., a reason-header AVP, etc., before being passed to a charging control function (CCF). In an embodiment, a CCF can verify that an ACR comprises a valid, acceptable, etc., reason before passing the ACR to a charging gateway function (CGF) and, where the reason in the ACR is not acceptable, valid, etc., the CCF can update the reason, e.g., by causing a query seeking an acceptable, valid, etc., reason, for example, from a terminating device. A response to the example query can be used to update the reason in the ACR before passing the ACR to the CGF and generation of a CDR. By forcing the CDR to comprise a valid, acceptable, etc., reason, e.g., a valid, acceptable, etc., reason-header AVP, etc., the CDR can affect billing, which in turn can correspondingly affect revenue received for providing communication services. Moreover, the disclosed subject matter can accept conventional reason-header AVPs in SIP error messages, e.g., 'BYE,' 'CANCEL,' etc., in a backwards compatible manner.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate responding to an invalid termination reason in an accounting record via an improved charging component, in accordance with aspects of the subject disclosure. System 100 can comprise internet protocol (IP) multimedia system (IMPS) component 102 that can facilitate communications, e.g., via SIP methods, DIAMETER protocols, etc. IMPS component 102 can comprise improved charging component 110 that can respond to an invalid reason, e.g., missing reason, sparse reason, unclear reason, etc. IMPS component 102 can receive session termination information (STI) 120 from first network component(s) 190. As an example, a mobile device can terminate a communication session and transmit STI, e.g., a SIP error message, SIP response code, etc. In an aspect, STI 120 can indicate a conventionally valid reason-header AVP, such as, SIP response code 487 for 'BYE,' 'CANCEL,' etc. In another aspect, STI 120 can indicate a conventionally invalid reason-header AVP, such as, no reason-header AVP at all, reason-headers AVPs for SIP response codes other than for 'BYE,' 'CANCEL,' etc., such as SIP response code 403—forbidden, SIP response code 406—not acceptable, etc.

IPMS component 102 can generate CDR 130 based on STI 120 and can communicate CDR 130 towards second network component(s) 192. CDR 130 can be used in billing or other services and inclusion of a valid reason-header AVP can affect revenue received in response to the billing based on CDR 130. As such, improved charging component 110 can facilitate providing a valid reason, e.g., a valid reason-header AVP in an ACR, in CDR 130. In an aspect, improved charging component 110 can verify that a valid reason is in an ACR and, where a valid reason is not comprised in the ACR, can populate a reason field of the ACR with a reason from STI 120, etc. Moreover, where the ACR comprises a reason, improved charging component 110, in an embodiment, can validate the reason and, where the reason is not acceptable, invalid, etc., can query, e.g., via first network component(s), etc., for a valid reason. Where a response to the query comprises a valid reason, the ACR can be updated to reflect the valid reason such that CDR 130 comprises a valid reason. Accordingly, billing/revenue can be altered based on CDR 130 comprising a valid reason, for example, not billing for units of time corresponding to termination of a communication session that were not voluntarily terminated based on input received from a user via a user interface, for example, not charging for a last minute of time where a call is dropped because of a server error, etc., e.g., where a user does not voluntarily terminate a call causing 'BYE' SIP response code to be passed to IPMS component 102 via STI 120 from first network component(s) 190.

Figure 2:
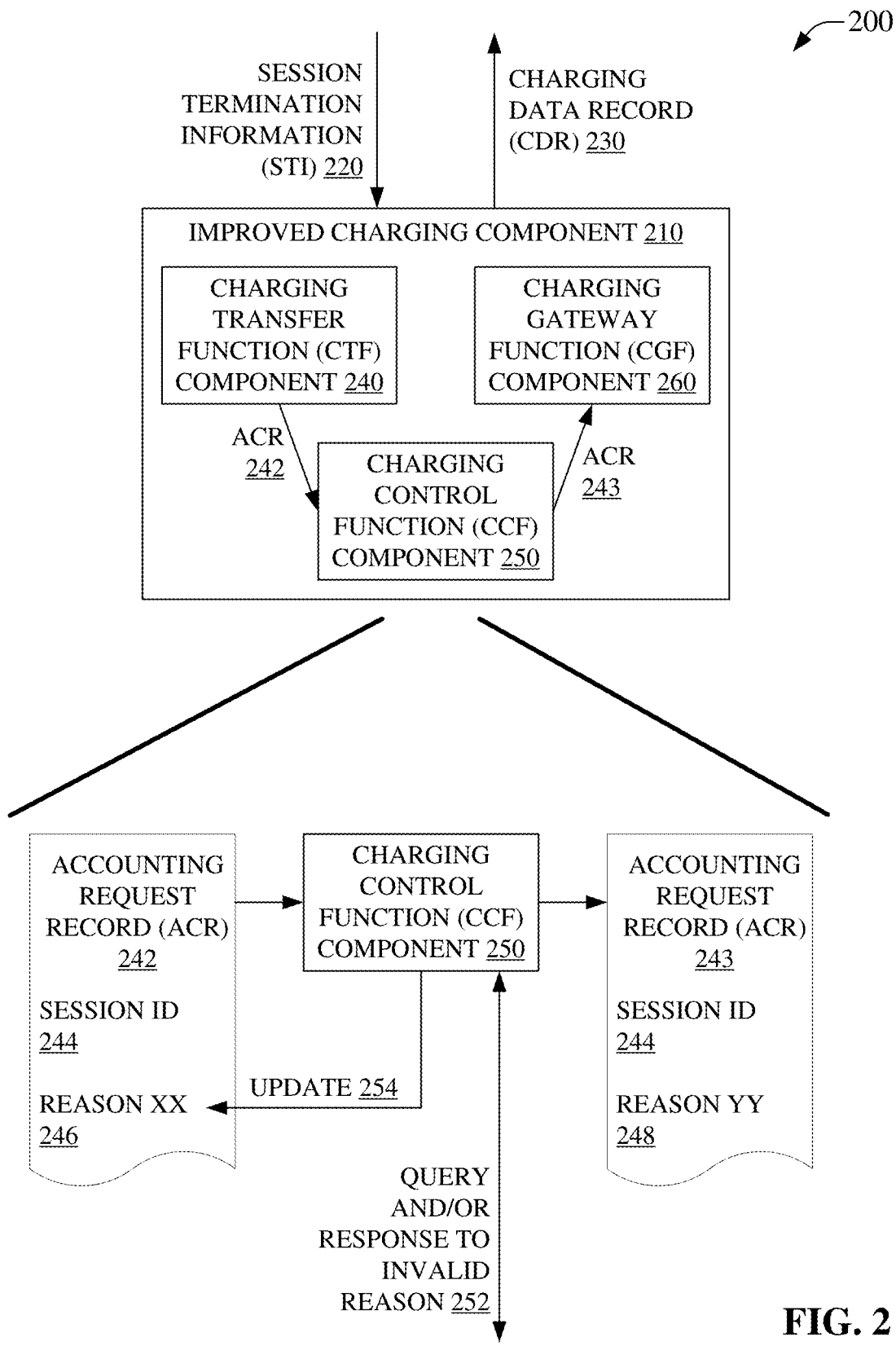
FIG. 2 is an illustration of an example system that can facilitate responding to an invalid termination reason in an accounting record via deriving a reason from session termination information, and/or updating an accounting request record via a charging control function component, in accordance with aspects of the subject disclosure.

FIG. 2 is an illustration of a system 200, which can enable responding to an invalid termination reason in an accounting record via deriving a reason from session termination information, and/or updating an accounting request record via a charging control function component, in accordance with aspects of the subject disclosure. System 200 can comprise improved charging component 210 that can receive STI 220 and generate corresponding CDR 230. In an embodiment, improved charging component 210 can comprise CTF component 240 that can generate ACR record 242 towards CCF component 250. Improved charging component 210, in some embodiments can comprise CCF component 250 that, based on receiving ACR record 242, can generate ACR record 243 towards CGF component 260. In some embodiments, CGF component 260 can facilitate generating CDR 230, for example, towards a billing system component, etc.

In an aspect, ACR record 242, hereinafter ACR 242, can comprise fields such as a session identifier field, e.g., session ID 244, and a reason field, e.g., reason xx 246, or other field(s). In an aspect, ACR 242 can be generated by CTF component 240 in response to receiving STI 220. Conventional technologies can provide for ACR 242 including a 'BYE' or 'CANCEL' reason in an ACR reason field, e.g., reason xx 246 can indicate that STI 220 comprised a conventional 'BYE' or 'CANCEL' SIP response code. However, CTF component 240 of improved charging component 210 can verify that a generated ACR, e.g., ACR 242, etc., comprises a value in a reason field, e.g., reason xx 246 can be verified to be present in ACR 242 where generated by CTF component 240 of improved charging component 210. Accordingly, where a SIP response code is not present in STI 220, where SIP response codes other than BYE or CANCEL are comprised in STI 220, e.g., other SIP 4xx, 5xx, etc., response codes are provided, etc., which can result in a conventional system or method failing to populate a reason field in an ACR, CTF component 240 of improved charging component 210 can determine that the reason field is not populated. In response, in some embodiments, CTF component 240 can populate the reason field. In an embodiment, CTF component 240 can populate the reason field with conventionally acceptable reasons, e.g., BYE, CANCEL, etc. In an embodiment, CTF component 240 can populate the reason field with other reasons, e.g., SIP response codes other than BYE, CANCEL, etc. In an embodiment, CTF component 240 can populate the reason field with a placeholder reason that can indicate that no reason was provided for inclusion in an ACR, e.g., the response field can indicate 'missing,' 'no reason provided,' etc.

Accordingly, CCF component 250 can receive ACR 242 with a reason field populated, e.g., reason xx 246. Reason xx 246 can be populated because CTF component 240 received a conventionally acceptable reason such as BYE, CANCEL, etc., can be because CTF component 240 received a reason other than a conventionally acceptable reason, can be because CTF component 240 received no reason and substituted a placeholder reason, etc. CCF component 250 can validate that reason xx 246 of ACR 242 is an acceptable reason.

In an aspect, CCF component 250 can validate that reason xx 246 of ACR 242 is an acceptable reason. In an embodiment, reason xx 246 can be acceptable where it is a conventionally acceptable reason such as BYE, CANCEL, etc. In an embodiment, reason xx 246 can be acceptable where it is another reason, for example, corresponding to another SIP response code, e.g., other than BYE, CANCEL, etc., such as another acceptable 4xx or 5xx SIP response code, etc. In an embodiment, reason xx 246 can be determined to be unacceptable where it is a placeholder reason, e.g., indicating that a reason was not provided in STI 220, etc., or where it indicates another unacceptable reason, such as an unacceptable 4xx or 5xx SIP response code, etc.

In an aspect, where CCF component 250 determines that reason xx 246 is valid, acceptable, etc., CCF component 250 can pass ACR 242 towards CGF component 260 as ACR 243, where reason yy 248 is the same as reason xx 246. As an example, where STI 220 comprises a 'BYE' SIP response code, CTF component 240 can generate ACR 242, comprising 'BYE' as reason xx 246, towards CCF component 250, whereby CCF component 250 can verify that 'BYE' is acceptable and can, in response, generate ACR 243, or pass ACR 242 as ACR 243, towards CGF 260 wherein reason yy 248 is 'BYE'. CGF component 260 can then facilitate generating CDR 230 indicating 'BYE', e.g., towards a billing system component, such that the resulting revenue can reflect the 'BYE' termination of the communication session.

In another aspect, where CCF component 250 determines that reason xx 246 is valid, acceptable, etc., albeit other than the conventionally acceptable reasons such as 'BYE,' 'CANCEL,' etc., CCF component 250 can pass ACR 242 towards CGF component 260 as ACR 243, where reason yy 248 is the same as reason xx 246. As an example, where STI 220 comprises a '403-forbidden' SIP response code, CTF component 240 can generate ACR 242, comprising a 403-forbidden reason as reason xx 246, towards CCF component 250, whereby CCF component 250 can verify that '403-forbidden' is acceptable and can, in response, generate ACR 243, or pass ACR 242 as ACR 243, towards CGF 260 wherein reason yy 248 is '403-forbidden'. CGF component 260 can then facilitate generating CDR 230 indicating '403-forbidden', e.g., towards a billing system component, such that the resulting revenue can reflect the '403-forbidden' termination of the communication session.

In a similar aspect, where CCF component 250 determines that reason xx 246 is not valid, not acceptable, etc., CCF component 250 can update, e.g., via update 254, ACR 242 before passing it towards CGF component 260. In an embodiment, updating ACR 242 by CCF component 250 can comprise updating reason xxx 246 via update 254, resulting in ACR 243 where reason yy 248 is the update of reason xx 246. In an aspect, reason xx 246 being unacceptable can comprise reason xx 246 being a placeholder for a missing reason, can comprise reason xx 246 being indicating another SIP response code that is determined not to satisfy a validity rule, etc. As an example, where STI 220 comprises a '599-not defined' SIP response code, CTF component 240 can generate ACR 242, comprising a '599-not defined' reason as reason xx 246, towards CCF component 250, whereby CCF component 250 can determine that this reason is not acceptable and can, in response, seek to update reason xx 246 via update 254. In an embodiment, the update can be based on a response to a query, e.g., query and/or response to invalid reason 252, etc. In an aspect, CCG component 250 can provide a query, and receive a corresponding response, that relates to updating, via update 254, reason xx 246 with a valid reason. As an example, where reason xx 246 is '599-not defined,' CCF component 250 can query a device, e.g., via first network component(s) 190, etc., to determine a valid SIP response code. This valid SIP response code can then be used, via update 254, to update reason xx 246, of ACR 243, to reason yy 248 of ACR 243. In another example, where reason xx 246 is a placeholder value indicating that STI 220 did not comprise a reason-header AVP, CCF component 250 can determine update 254, e.g., via query and/or response to invalid reason 252, to update reason xx 246, of ACR 243, to reason yy 248 of ACR 243. It will be noted that CTF 240 can generate ACR 242 based on STI 220, e.g., ACR 242 can be generated to comprise reason xx 246 based on STI 220, wherein STI 220 can comprise a conventionally valid SIP response code, another SIP response code that would not conventionally be passed via ACR to a billing system component, an invalid SIP response code, a placeholder code where STI 220 does not indicate any SIP response code, etc.

System 200 can force CDT 230 to comprise a valid reason-header AVP that reflects why a communication session was terminated. Unlike conventional technology that can merely indicate a 'BYE' or 'CANCEL' reason-header AVP in a CDR, system 200 can additionally provide a reason-header AVP for other SIP response codes, can seek out a SIP response code where STI 220 does not already comprise a SIP response code, etc. Additionally, the reason-header AVP can be based on reasons that have been determined to be acceptable by CCF component 250. As such, system 200 can provide much richer, and valid, information than conventional technologies, which rich and valid reason-header AVP information can be used to adjust billing and can correspondingly result in altered received revenue.

Figure 3:
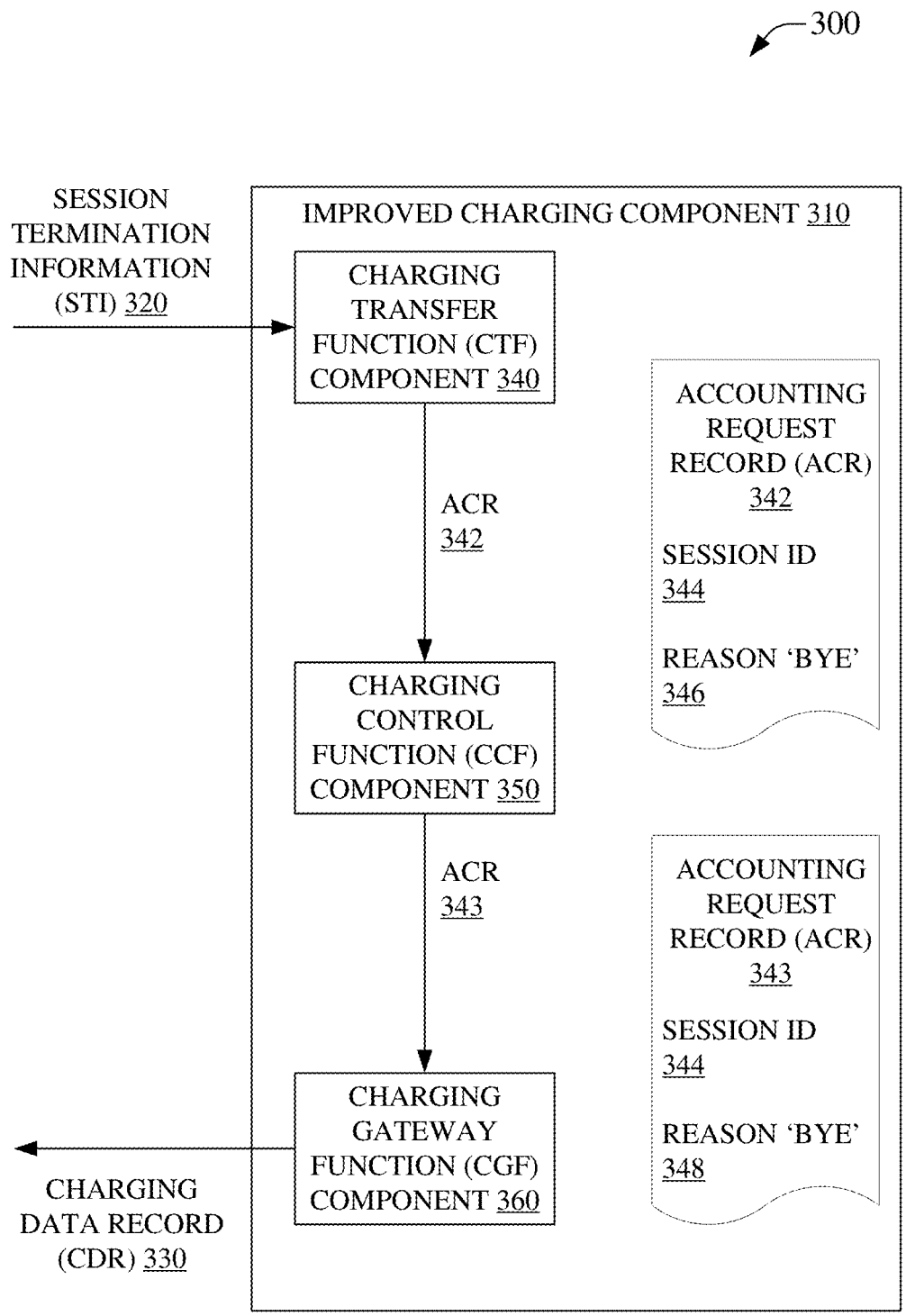
FIG. 3 is an illustration of an example system that can enable responding to a valid termination reason in an accounting record via an improved charging component, in accordance with aspects of the subject disclosure.

FIG. 3 is an illustration of a system 300, which can facilitate responding to a valid termination reason in an accounting record via an improved charging component, in accordance with aspects of the subject disclosure. System 300 can comprise improved charging component 310 that can receive STI 320 and generate corresponding CDR 330. In an embodiment, improved charging component 310 can comprise CTF component 340 that can generate ACR record 342 towards CCF component 350. CCF component 350, based on receiving ACR record 342, can generate ACR record 343 towards CGF component 360. CGF component 360 can generate CDR 330, for example, towards a billing system component, etc.

In an aspect, ACR 342 can comprise session ID 344, reason xx 346, etc. In an aspect, ACR 342 can be generated by CTF component 340 in response to receiving STI 320. CTF component 340 can generate ACR 342 to comprise a conventionally acceptable 'BYE,' 'CANCEL,' or other conventionally acceptable reason in reason xx 346. These conventionally acceptable reasons can be comprised in STI 320. Accordingly, CCF component 350 can receive ACR 342 and can validate that reason xx 346 of ACR 342 is an acceptable reason, e.g., CCF 350 can validate that 'BYE' is a valid reason. Given that reason xx 346 can be acceptable where it is a conventionally acceptable reason such as BYE, CANCEL, etc., CCF component 350 can pass ACR 342 towards CGF component 360 as ACR 343, where reason yy 348 is the same as reason xx 346. As an example, where STI 320 comprises a 'BYE' SIP response code, CTF component 340 can generate ACR 342, comprising 'BYE' as reason xx 346, towards CCF component 350, whereby CCF component 350 can verify that 'BYE' is acceptable and can, in response, generate ACR 343, or pass ACR 342 as ACR 343, towards CGF 360 wherein reason yy 348 is 'BYE'. CGF component 360 can then facilitate generating CDR 330 indicating 'BYE', e.g., towards a billing system component, such that the resulting revenue can reflect the 'BYE' termination of the communication session.

Figure 4:
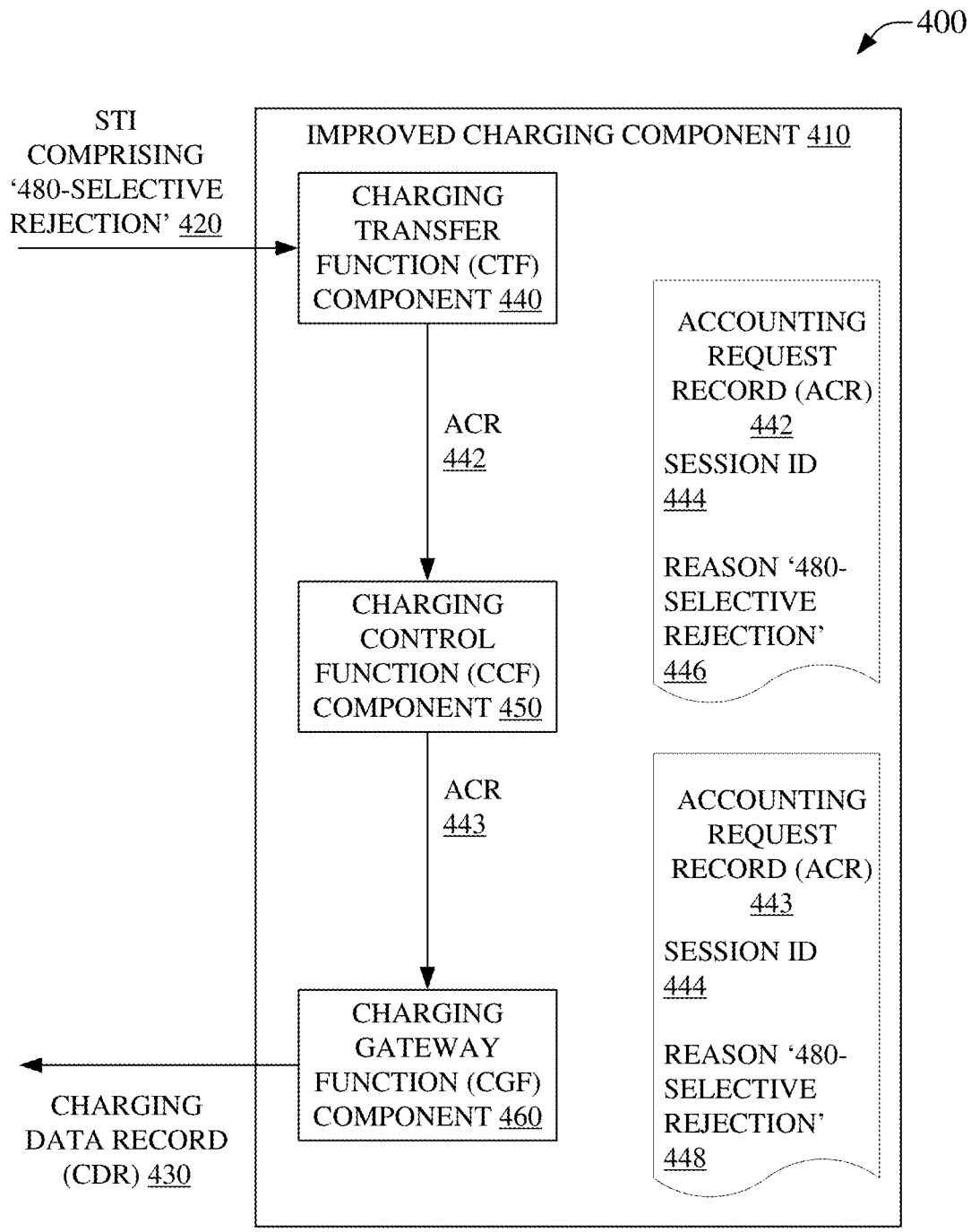
FIG. 4 illustrates an example system that can facilitate responding to other valid termination reasons in an accounting record via deriving a valid reason from session termination information, in accordance with aspects of the subject disclosure.

FIG. 4 is an illustration of a system 400, which can enable responding to other valid termination reasons in an accounting record via deriving a valid reason from session termination information, in accordance with aspects of the subject disclosure. System 400 can comprise improved charging component 410 that can receive STI 420 and generate corresponding CDR 430. In an embodiment, improved charging component 410 can comprise CTF component 440 that can generate ACR record 442 towards CCF component 450. CCF component 450, based on receiving ACR record 442, can generate ACR record 443 towards CGF component

460. CGF component 460 can generate CDR 430, for example, towards a billing system component, etc.

In an aspect, ACR 442 can comprise session ID 444, reason xx 446, etc. In an aspect, ACR 442 can be generated by CTF component 440 in response to receiving STI 420. CTF component 440 can generate ACR 442 to comprise a reason other than conventionally reasons such as BYE, CANCEL, etc., in reason xx. CTF component 440 can populate the reason field with these other reasons, e.g., SIP response codes other than BYE, CANCEL, etc., such that CCF component 450 can receive ACR 442 comprising reason other than a conventionally acceptable reason. As an example, as illustrated in system 400, reason xx can be example reason '480—selective rejection' 446. In response, CCF component 450 can validate that example reason '480—selective rejection' 446 of ACR 442 is also an acceptable reason.

In an aspect, CCF component 450 can validate that example reason '480—selective rejection' 446 of ACR 442 is an acceptable reason. As previously noted, reason xx can be acceptable where it is a conventionally acceptable reason such as BYE, CANCEL, etc., however, example reason '480—selective rejection' 446 can also be acceptable where it is another reason, for example, corresponding to another SIP response code, e.g., other than BYE, CANCEL, etc., such as another acceptable 4xx or 5xx SIP response code, etc. In an embodiment, reason xx can be determined to be unacceptable where it is a placeholder reason, e.g., indicating that a reason was not provided in STI 420, etc., or where it indicates another unacceptable reason, such as an unacceptable 4xx or 5xx SIP response code, etc.

In an aspect, where CCF component 450 determines that example reason '480—selective rejection' 446 is valid, acceptable, etc., CCF component 450 can pass ACR 442 towards CGF component 460 as ACR 443, where example reason '480—selective rejection' 448 is the same as example reason '480—selective rejection' 446. In this example, STI 420 can comprise '480—selective rejection' SIP response code, CTF component 440 can generate ACR 442, comprising '480—selective rejection' as example reason '480—selective rejection' 446, towards CCF component 450, whereby CCF component 450 can verify that '480—selective rejection' is acceptable and can, in response, generate ACR 443, or pass ACR 442 as ACR 443, towards CGF 460 wherein reason yy is '480—selective rejection', e.g., in example reason '480—selective rejection' 448. CGF component 460 can then facilitate generating CDR 430 indicating '480—selective rejection', e.g., towards a billing system component, such that the resulting revenue can reflect the example reason '480—selective rejection' termination of the communication session.

Figure 5:
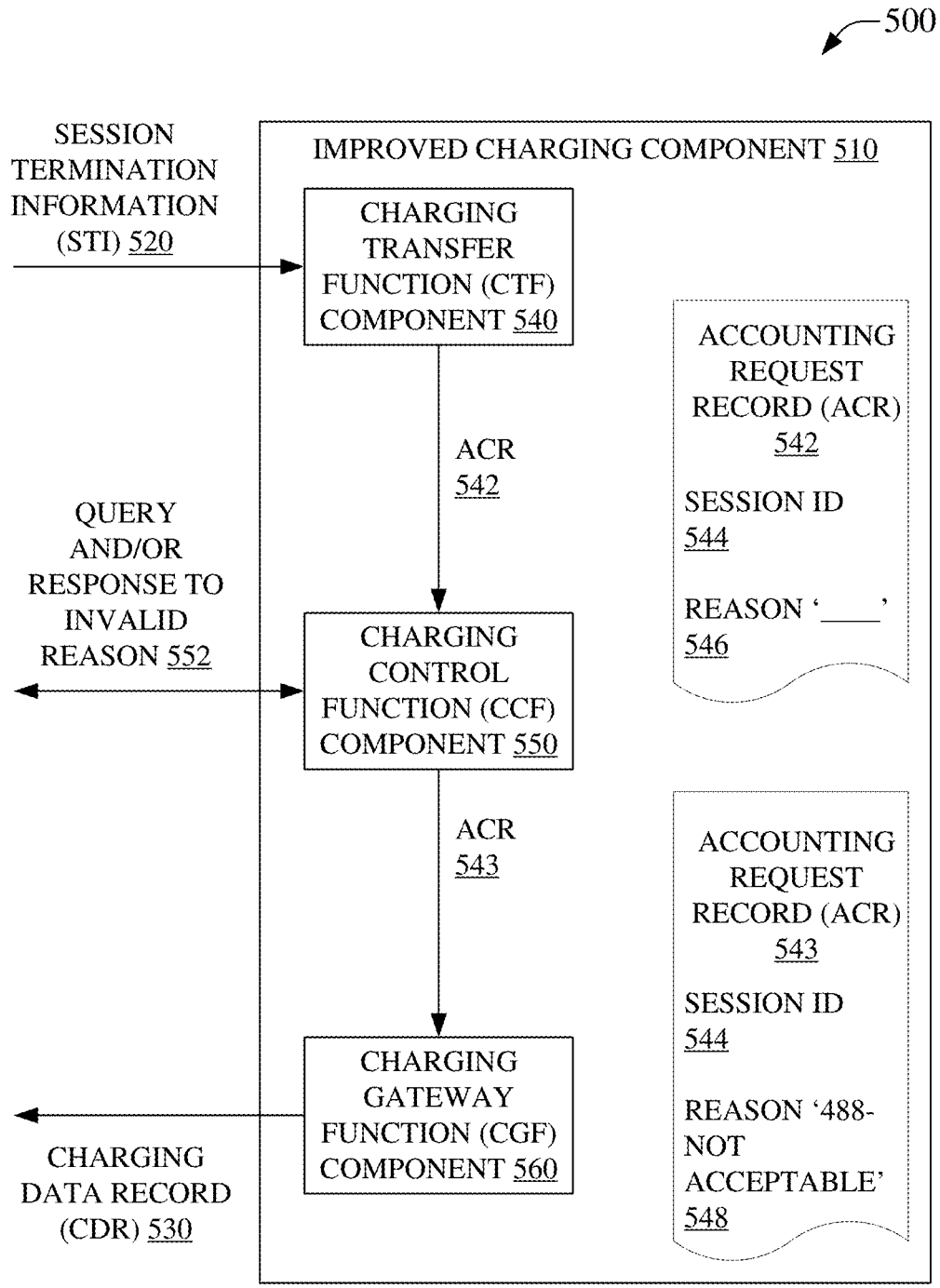
FIG. 5 is an illustration of an example system that can facilitate responding to an invalid termination reason in an accounting record via updating an accounting request record based on a query/response via a charging control function component, in accordance with aspects of the subject disclosure.

FIG. 5 is an illustration of an example system 500, which enables responding to an invalid termination reason in an accounting record via updating an accounting request record based on a query/response via a charging control function component, in accordance with aspects of the subject disclosure. System 500 can comprise improved charging component 510 that can receive STI 520 and generate corresponding CDR 530. Improved charging component 510 can comprise CTF component 540 that can generate ACR record 542 towards CCF component 550. Improved charging component 510 can comprise CCF component 550 that, based on receiving ACR component 542, can generate ACR record 543 towards CGF component 560. In some embodiments, CGF component 560 can facilitate generating CDR 530, for example, towards a billing system component, etc.

In an aspect, ACR 542 can comprise fields such as session ID 544, reason xx 546, etc. In an aspect, ACR 542 can be generated by CTF component 540 in response to receiving STI 520. CTF component 540 can generate ACR 542, etc., which can comprise a value in a reason field, e.g., reason xx 546, etc. Reason xx 546 can be generated from data of STI 520, e.g., a reason-header of STI 520 can be used to populate a reason field of ACR 542 with reason xx. In an aspect, where STI 520 does not comprise data that can be used to populate the reason field, CTF component 540 can populate the reason field with a placeholder, e.g., reason '_____' 546, etc.

Reason '_____' 546, e.g., the placeholder, can indicate 'missing,' 'no reason provided,' etc., in STI 520. Accordingly, CCF component 550 can receive ACR 542 with a reason field populated with the placeholder reason and CCF component 550 can determine that reason xx 546 is not valid, not acceptable, etc., e.g., a missing reason or blank reason can be determined to be unacceptable, etc. CCF component 550 can update, e.g., via update 554, ACR 542 before passing it towards CGF component 560. In an embodiment, updating ACR 542 by CCF component 550 can comprise updating reason '_____' 546 via update 554, resulting in ACR 543 where example reason '488—not acceptable' 548 is acceptable and is the update of reason '_____' 546. In an aspect, CCF component 550 can determine the update in response to a query, e.g., query and/or response to invalid reason 552, etc. In an aspect, CCF component 550 can provide a query, and receive a corresponding response, that relates to updating, via update 554, reason '_____' 546 with a valid reason. As an example, CCF component 550 receiving reason '_____' 546 can cause CCF component 550 can query a device, e.g., via first network component(s) 190, etc., to determine a valid SIP response code. This valid SIP response code can then be used, via update 554, to update reason '_____' 546, of ACR 543, to reason yy of ACR 543, for example, as example reason '488—not acceptable' 548, which can be passed on to a billing component, e.g., via CDR 530 generated by CGF component 560.

Figure 6:
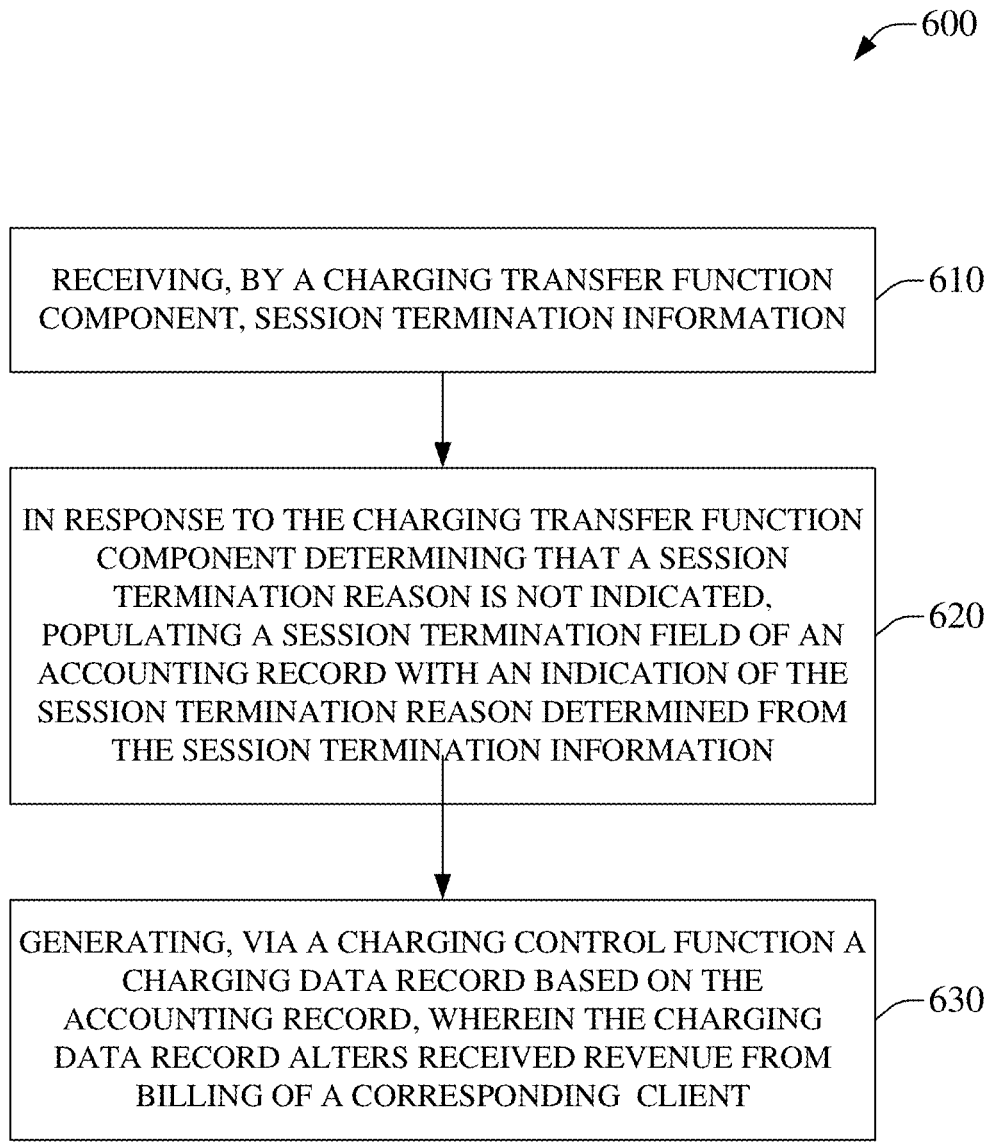
FIG. 6 is an illustration of an example method enabling responding to an invalid termination reason in an accounting record via deriving a valid reason from session termination information, in accordance with aspects of the subject disclosure.

FIG. 6 is an illustration of an example method 600, which facilitates responding to an invalid termination reason in an accounting record via deriving a valid reason from session termination information, in accordance with aspects of the subject disclosure. At 610, method 600 can comprise receiving, by a charging transfer function (CTF) component, session termination information (STI). In an aspect, when a SIP message, e.g., a SIP error message, SIP response code, etc., is communicated to a charging/billing component, STI can comprise data relevant to determining a reason-header AVP corresponding to the SIP error message, SIP response code, etc. In an aspect, STI can fail to comprise a reason, can comprise an invalid reason, can comprise a sparse reason, can comprise a valid reason, can comprise a conventionally valid reason, e.g., 'BYE,' 'CANCEL,' etc., or can comprise other indications related to termination of a communication session.

At 620, a session termination field of an accounting record (ACR) can be populated with an indication of the session termination reason, for example, in response to the CTF determining that an ACR does not comprise a session termination reason, a reason can be determined based on the STI received, for example, at 610, etc. As such, the subject disclosure can force the ACR to comprise a value in a reason field of the ACR, either by generating an ACR already comprising a reason or, where the ACR is generated without a reason, then determining a reason from the STI and populating a reason filed of the ACR before passing the ACR to a charging control function (CCF). In embodiments, the reason can be a conventionally valid reason, such as BYE/CANCEL, can be another valid reason, such as another SIP 4xx/5xx/etc., reason, can be an invalid reason, can be a placeholder reason where no reason can be determined/provided, etc.

At 630, method 600 can comprise generating, via a CCF, a charging data record (CDR), based on the ACR, e.g., based on the reason of the reason filed of the ACR. At this point method 600 can end. In an embodiment, The CDR can alter received revenue via altering billing of a corresponding client based on the reason, for example, where the reason indicates that the client terminated the communication session the billing and revenue can be different from where, as indicated by the reason in the reason filed of the ACR, a server failure terminated the communication session.

In some embodiments, the reason field can indicate a conventionally acceptable reason, such as a SIP 'BYE' or SIP 'CANCEL' reason. In other embodiments, the reason field can indicate an acceptable reason other than a conventionally acceptable reason, such as another SIP 4xx/5xx response code. In some embodiments, the reason field can indicate an invalid reason, which can cause charging components to update the reason, for example, based on a query/response seeking additional termination reason information from a device associated with the communication session that was terminated. As an example, where STI does not indicate termination reason, a placeholder reason can be forced into an ACR that causes a query of a communication server component, wherein the response to the query can indicate a valid reason, such that the valid reason can be used to update the placeholder reason and allow a CDR to be generated towards a billing system component that reflects the valid reason and alters corresponding billing and received revenue. As another example, the STI can indicate a conventional BYE reason that is comprised in a generated ACR and is then passed to the billing system via a CDR in response to validating the BYE reason in the ACR. As a further example, the STI can indicate a 4xx SIP response code that can be comprised in a generated ACR and is, in response to being determined to be an acceptable reason, passed via CDR to a billing system component. As a still further example, the STI can comprise a SIP response code that is included in the ACR but is determined to be invalid and is then updated to a valid reason before the valid reason is communicated via a CDR to a billing system component.

Figure 7:
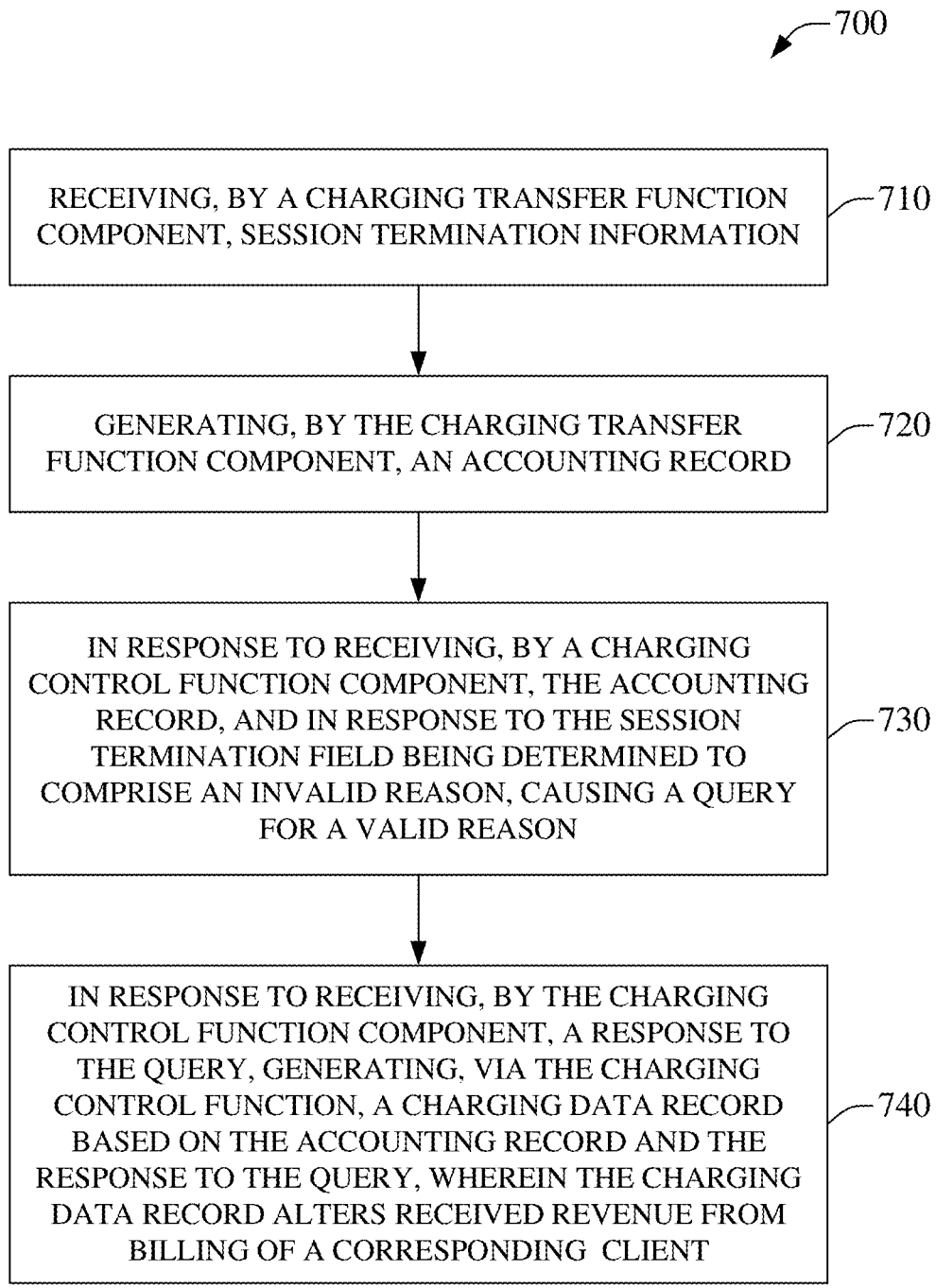
FIG. 7 illustrates an example method facilitating responding to an invalid termination reason in an accounting record via updating an accounting request record based on a query/response via a charging control function component, in accordance with aspects of the subject disclosure.

FIG. 7 illustrates example method 700 facilitating responding to an invalid termination reason in an accounting record via updating an accounting request record based on a query/response via a charging control function component, in accordance with aspects of the subject disclosure. Method 700, at 710, can comprise receiving STI at a CTF component, wherein the STI can comprise a reason, e.g., a reason-header AVP, etc., related to termination of a communication session. In an aspect, the reason can be communicated via a CDF to a charging/billing system component in response to the reason being determined to satisfy a validity rule.

At 720, an ACR can be generated by the CTF. In an aspect, the ACR can comprise a session termination field that can be populated with an indication of the session termination reason. In an aspect, where a CTF generates an ACR that does not comprise a session termination reason, a reason can be determined based on the STI received, and the reason can be pushed into the ACR. In another aspect, the ACR can be generated with the session termination reason where it is provided in the STI. As noted elsewhere herein, the CTF can force the ACR to comprise a value in a reason field of the ACR, either by generating an ACR already comprising a reason or, where the ACR is generated without a reason, by determining a reason from the STI and populating a reason filed of the ACR before passing the ACR to another component, e.g., a CCF component, etc.

At 730, method 700 can comprise generating, a query related to determining a valid reason. The generating the query can be in response to receiving the ACR by the CCF and further in response to determining that the session termination filed comprises an invalid reason. As an example, the reason can be generic and fail to be sufficient for a billing system to determine a billing criterion, which can be determined to be an invalid reason.

Correspondingly, method 700, at 740, can comprise receiving a response to the query at the CCF component. The response can cause an updating of the reason code of an ACR. Further, the receiving the response can result in generating a CDR by the CCF. In an aspect the CDR can be based on the updated ACR comprising the valid reason. At this point, method 700 can end. In an aspect the CDR can alter revenue received from billing of a corresponding client, e.g., the CDR can alter the billing, which can result in a change in received revenue.

Figure 8:
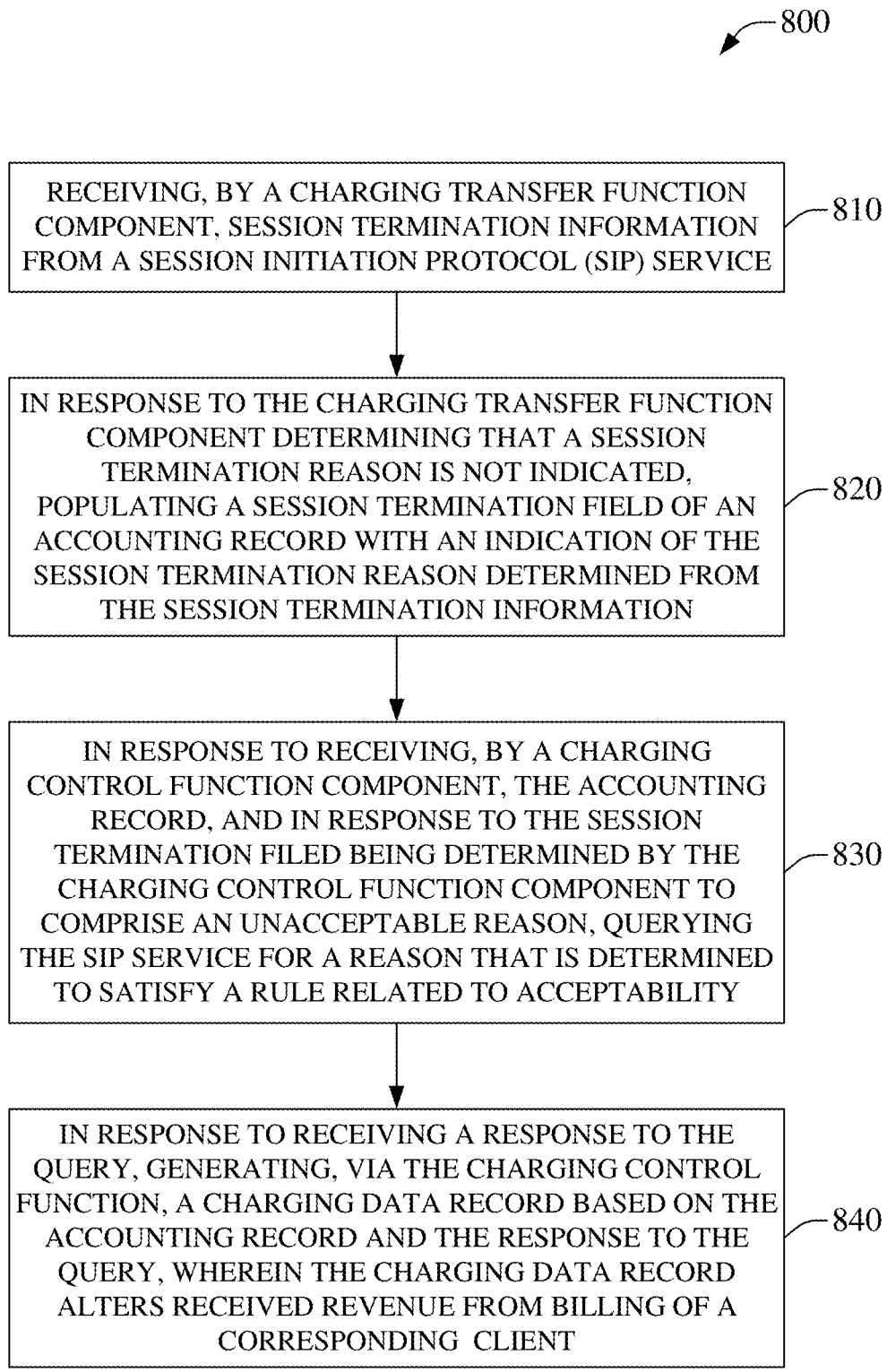
FIG. 8 illustrates an example method enabling responding to an invalid termination reason in an accounting record via deriving a reason from session termination information and, in response to the reason being determined to be unacceptable, updating an accounting request record via a charging control function component querying a SIP service for an acceptable reason, in accordance with aspects of the subject disclosure.

FIG. 8 illustrates example method 800 enabling responding to an invalid termination reason in an accounting record via deriving a reason from session termination information and, in response to the reason being determined to be unacceptable, updating an accounting request record via a charging control function component querying a SIP service for an acceptable reason, in accordance with aspects of the subject disclosure. Method 800, at 810, can comprise receiving STI at a CTF component, wherein the STI comprises a SIP response code related to termination of a SIP service. In an aspect, the SIP response code can communicated via a CDF to a charging/billing system component in response to the SIP response code being determined to satisfy a validity rule.

At 820, in response to the CTF determining that a session termination reason is not indicated in an ACR, can populate a session termination field of an ACR with an indication of the session termination reason based on the STI, e.g., the SIP response code, etc. Where a CTF initially generates an ACR that does not comprise a session termination reason, a reason can be determined based on the STI received, and the reason can be used to update the ACR to comprise the reason. As noted elsewhere herein, the CTF can force the ACR to comprise a value in a reason field of the ACR, either by generating an ACR already comprising a reason or, where the ACR is generated without a reason, by determining a reason from the STI and populating a reason filed of the ACR before passing the ACR to another component, e.g., a CCF component, etc.

At 830, method 800 can comprise generating, a query related to determining a valid reason, e.g., a valid SIP response code, etc. The generating the query can be in response to receiving the ACR by the CCF and further in response to determining that the session termination filed comprises an unacceptable reason, e.g., an unacceptable SIP response code, etc. As an example, the SIP response code can fail to indicate a value that can be employed by a billing system to determine a billing criterion.

At 840, method 800 can comprise, in response to receiving a response to the query at the CCF component, generating a CDR based on an updated reason code of an ACR. In an aspect the CDR can be based on the updated ACR comprising a valid reason based on the received response to the query at 830. At this point, method 800 can end. In an aspect the CDR can alter revenue received from billing of a corresponding client, e.g., the CDR can alter the billing, which can result in a change in received revenue.

Figure 9:
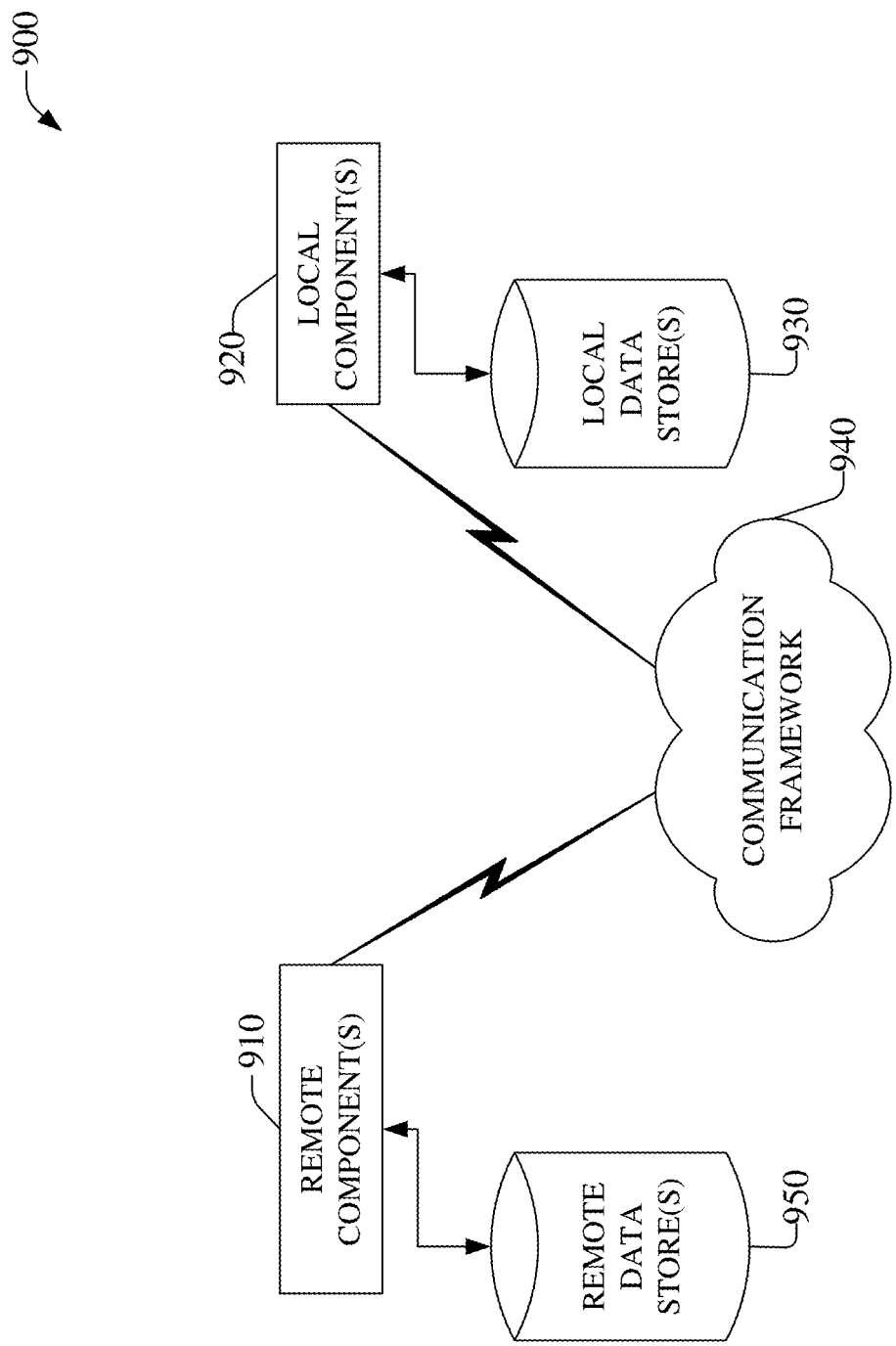
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise first network component 190, second network component(s) 192, etc., or other component(s) or device(s) that are located remotely from IMPS component 102, etc.

The system 900 also comprises one or more local component(s) 920. The local component(s) 920 can be hardware and/or software (e.g., threads, processes, computing devices). In some embodiments, local component(s) 920 can comprise IMPS component 102, etc., or other component(s) or device(s) that are located local to IMPS component 102, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, STI 120, 220, 320, 420, 520, etc., or CDR 130, 230, 330, 430, 530, etc., can be stored at IMPS component 102, etc., e.g., on local data storage device(s) 930, etc., to facilitate responding to an invalid (or valid) termination reason in an accounting record via an improved charging component as disclosed in the presently recited subject matter.

Figure 10:
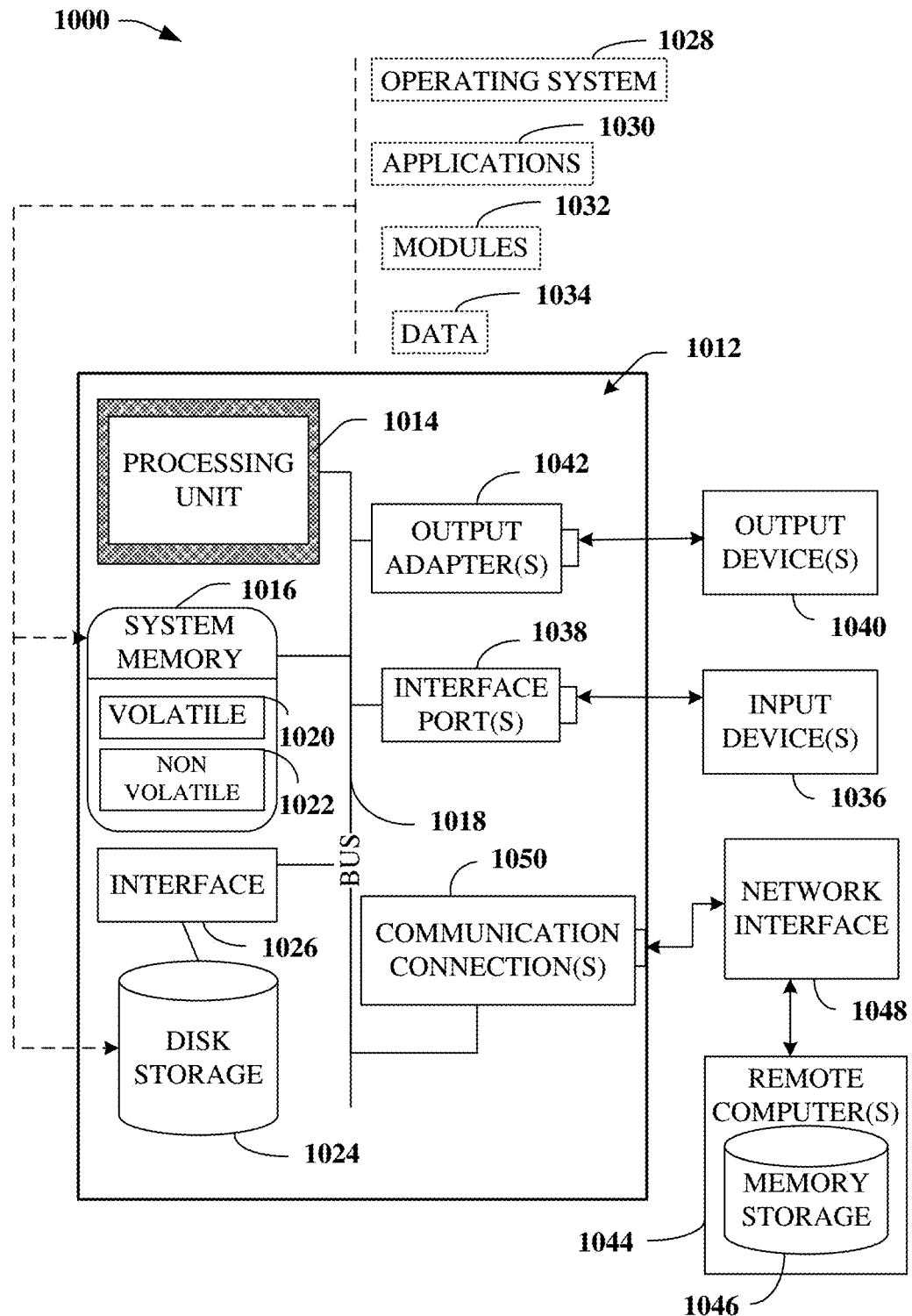
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in IMPS component 102, etc., improved charging component 102, CTF 240, 340, 440, 540, etc., CCF 250, 350, 450, 550, etc., CGF 260, 360, 460, 560, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising initiating a slice event based on a slice event instruction corresponding to analysis of network analytics for various portions of a network, and can be based on rules and/or inferences related to the analysis of the network analytics.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
 a processor; and
 a memory that stores executable instructions that, when executed by the processor, facilitate performance of operations, comprising:
  in response to a communication session being determined to have terminated, receiving a reason-header corresponding to a cause of the termination of the communication session;
  determining whether the reason-header comprises a valid indicator of the cause of the termination of the communication session;
  in response to the reason-header being determined not to comprise the valid indicator, determining the valid indicator of the cause the termination of the communication session; and
  enabling a charging control function to access the valid indicator.

2. The device of claim 1, wherein determining the valid indicator comprises querying a session initiation protocol device corresponding to the communication session that was terminated according to the termination.

3. The device of claim 2, wherein querying comprises generating an error message towards the session initiation protocol device.

4. The device of claim 1, wherein determining the valid indicator comprises determining the valid indicator is a 4xx message.

5. The device of claim 4, wherein the valid indicator is a '403 Forbidden' indicator.

6. The device of claim 1, wherein determining the valid indicator comprises determining the valid indicator is a 5xx message.

7. The device of claim 1, wherein the cause of the termination of the communication session is caused by a process other than a session initiation protocol 'BYE' process.

8. The device of claim 1, wherein the cause of the termination of the communication session is caused by a process other than a session initiation protocol 'CANCEL' process.

9. The device of claim 1, wherein the reason-header comprises a reason indicator that is an invalid reason indicator.

10. The device of claim 9 wherein the invalid reason indicator is invalid as a result of the reason indicator not being a recognized valid reason indicator by the device.

11. The device of claim 1, wherein the reason-header comprises an empty reason indicator.

12. A method, comprising:
 receiving, by a system comprising a processor and a memory, session termination information for a communication session;
 in response to determining, by the system, that a session termination reason is not indicated in an accounting record, populating a session termination field of the accounting record with an indication of the session termination reason;
 in response to determining that the session termination reason is a first session initiation protocol response code that does not satisfy a rule related to an allowable session initiation protocol response code, generating, by the system, a query directed to a device that supported the communication session, wherein a response to the query comprises a second session initiation protocol response code; and
 generating, by the system, a charging data record based on the accounting record, wherein the charging data record is employed in adapting billing for the communication session.

13. The method of claim 12, further comprising, determining, by the system, that the session termination reason is a session initiation protocol response code that does not correspond to a 'BYE' method.

14. The method of claim 12, The method of claim 12, further comprising, determining, by the system, that the session termination reason is the first session initiation protocol response code that does not correspond to a 'CANCEL' method.

15. The method of claim 12, further comprising, updating, by the system, the accounting record to replace the first session initiation protocol response code with the second session initiation protocol response code, resulting in an updated accounting record, and wherein the generating the charging data record is based on the updated accounting record.

16. The method of claim 15, wherein updating the accounting record is performed in response to determining, by the system, that the second session initiation protocol response code satisfies the rule related to the allowable session initiation protocol response code.

17. A non-transitory machine-readable medium, comprising executable instructions that, when executed by a processor, facilitate performance of operations, comprising:
 receiving session termination information for a communication session;
 in response to determining that a session termination reason is not indicated in an accounting record, populating a session termination field of the accounting record with an indication of the session termination reason;
 in response to determining that the session termination reason comprises a first session initiation protocol response code that does not satisfy a rule related to an allowable session initiation protocol response code, generating a query directed to a device that supported the communication session prior to termination of the communication session, wherein a response to the query comprises a second session initiation protocol response code;

updating the indication of the session termination reason of the accounting record by replacing the first session initiation protocol response code with the second session initiation protocol response code, resulting in an updated accounting record; and generating a charging data record based on the updated accounting record, wherein the charging data record is employed in adapting billing for the communication session.

18. The non-transitory machine-readable medium of claim 17, wherein the updating the indication of the session termination reason is in response to determining that the second session initiation protocol response code satisfies the rule related to the allowable session initiation protocol response code.

19. The non-transitory machine-readable medium of claim 17, wherein the first session initiation protocol response code does not correspond to one of a group of session initiation protocol response codes, and wherein the group of session initiation protocol response codes comprises a 'BYE' session initiation protocol response code and a 'CANCEL' session initiation protocol response code.

* * * * *